(12) United States Patent
Kiryu et al.

(10) Patent No.: US 7,967,632 B2
(45) Date of Patent: Jun. 28, 2011

(54) CARD CONNECTOR

(75) Inventors: Koichi Kiryu, Shimotakai-gun (JP);
Hideo Miyazawa, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 0 days.

(21) Appl. No.: 12/578,679

(22) Filed: Oct. 14, 2009

(65) Prior Publication Data

US 2010/0216345 A1    Aug. 26, 2010

(30) Foreign Application Priority Data

Feb. 26, 2009   (JP) .................. 2009-043905

(51) Int. Cl.
*H01R 13/60* (2006.01)
(52) U.S. Cl. ..................... 439/541.5
(58) Field of Classification Search ............. 439/541.5, 439/79, 80, 604, 630
See application file for complete search history.

(56) References Cited

U.S. PATENT DOCUMENTS 6,929,513 B2 *   8/2005   Fan .................. 439/630

FOREIGN PATENT DOCUMENTS

JP           2007-012348 A       1/2007

* cited by examiner

*Primary Examiner* — T C Patel
*Assistant Examiner* — Phuongchi T Nguyen
(74) *Attorney, Agent, or Firm* — IPUSA, PLLC

(57) ABSTRACT

A card connector includes a base housing configured to allow attachment of different kinds of memory cards; multiple kinds of memory card contacts held in the base housing and configured to connect to the corresponding memory cards; a module housing stacked on the base housing and configured to allow attachment of an expansion module; and a module contact configured to connect to the expansion module. The memory card contacts and the module contact are electrically separated.

7 Claims, 6 Drawing Sheets

FIG.1
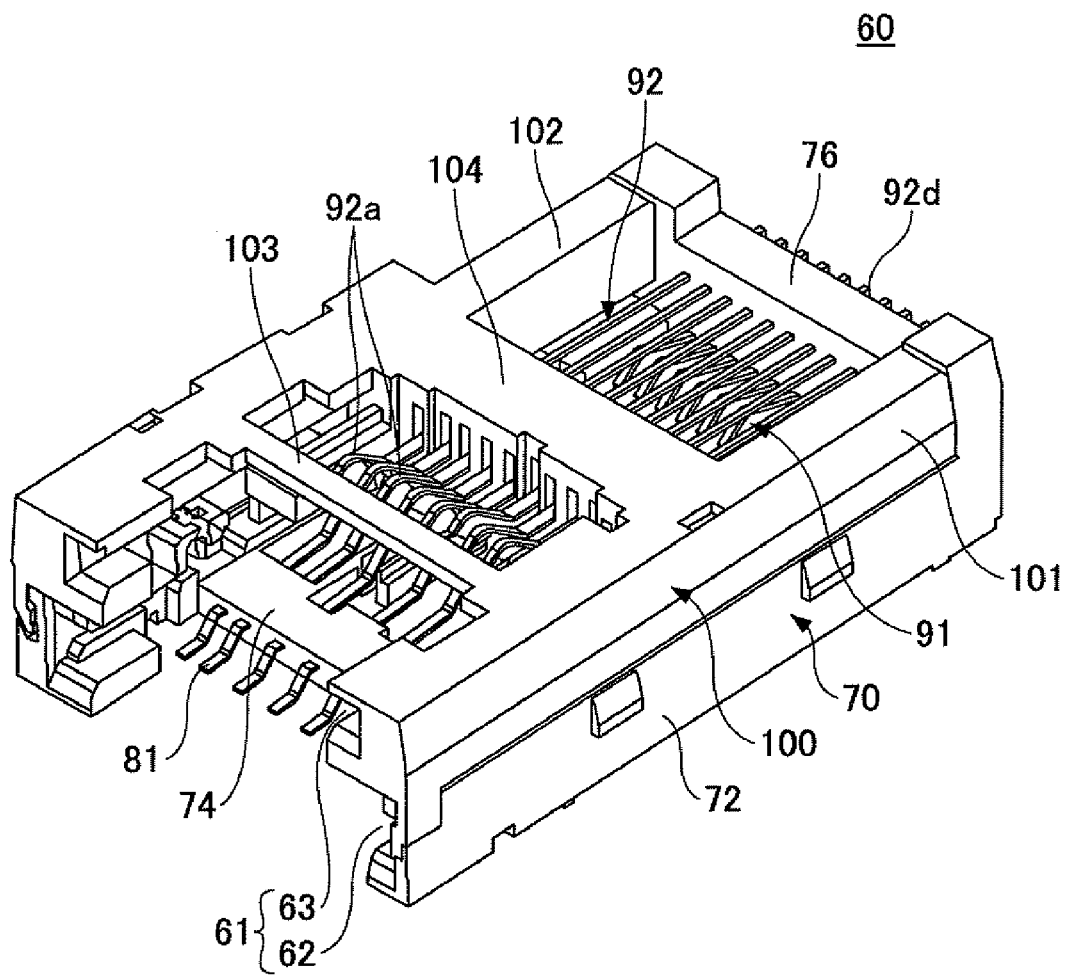
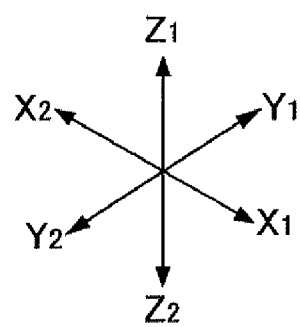

CARD CONNECTOR

CROSS-REFERENCE TO RELATED APPLICATION

The present application is based upon and claims the benefit of priority of Japanese Patent Application No. 2009-043905, filed on Feb. 26, 2009, the entire contents of which are incorporated herein by reference.

BACKGROUND OF THE INVENTION

1. Field of the Invention

The present invention relates to card connectors. More particularly, the present invention relates to a card connector configured to allow attachment of different kinds of memory cards.

2. Description of the Related Art

Card connectors for detachably attaching memory cards are incorporated in electronic apparatuses such as digital cameras, cellular phones, and electronic copiers. Electronic apparatuses read image data or audio data recorded on memory cards attached to their card connectors, and perform predetermined processing.

Currently, memory cards are available in various shapes and structures. For example, memory cards are provided such as Memory Stick (trademark), Memory Stick Duo (trademark), SD Memory Card (trademark), and MMC (MultiMedia Card) (trademark). Therefore, it is desired that card connectors allow selective attachment of various kinds of memory cards. Therefore, there are provided card connectors where a first insertion part for inserting a first memory card and a second insertion part for inserting a second memory card are disposed in a superposed manner. (See, for example, Japanese Laid-Open Patent Application No. 2007-012348.)

The universal-purpose characteristics of electronic apparatuses with respect to memory cards are improved by providing the electronic apparatuses with such card connectors that allow selective attachment of various kinds of memory cards. Further, this eliminates the necessity of providing individual card connectors for corresponding memory cards, thus making it possible to reduce electronic apparatuses in size.

SUMMARY OF THE INVENTION

According to an aspect of the present invention, a card connector includes a base housing configured to allow attachment of different kinds of memory cards; a plurality of kinds of memory card contacts held in the base housing and configured to connect to the corresponding memory cards; a module housing stacked on the base housing and configured to allow attachment of an expansion module; and a module contact configured to connect to the expansion module, wherein the memory card contacts and the module contact are electrically separated.

The object and advantages of the embodiment will be realized and attained by means of the elements and combinations particularly pointed out in the claims.

It is to be understood that both the foregoing general description and the following detailed description are exemplary and explanatory and not restrictive of the invention as claimed.

BRIEF DESCRIPTION OF THE DRAWINGS

Other objects, features and advantages of the present invention will become more apparent from the following detailed description when read in conjunction with the accompanying drawings, in which:

FIG. 1 is a perspective view of a card connector according to an embodiment of the present invention, illustrating its exterior;

DETAILED DESCRIPTION OF THE PREFERRED EMBODIMENTS

As described above, electronic apparatuses may be provided with card connectors that allow selective attachment of various kinds of memory cards. However, it is not only memory cards but also expansion modules expanding the functions of electronic apparatuses that are attached to them. Examples of expansion modules include expansion memory modules, expansion CPU modules, and expansion communications modules.

Conventionally, these expansion modules are attached to electronic apparatuses through slots and connectors for expansion modules provided separately from card connectors. However, this configuration requires expansion module connectors separately from card connectors, thus causing a problem in that electronic apparatuses are complicated in internal structure and are increased in size.

A description is given below, with reference to the accompanying drawings, of an embodiment of the present invention.

FIG. 1 through FIG. 6 are diagrams for illustrating a card connector 60 according to the embodiment of the present invention.

Figure 2:
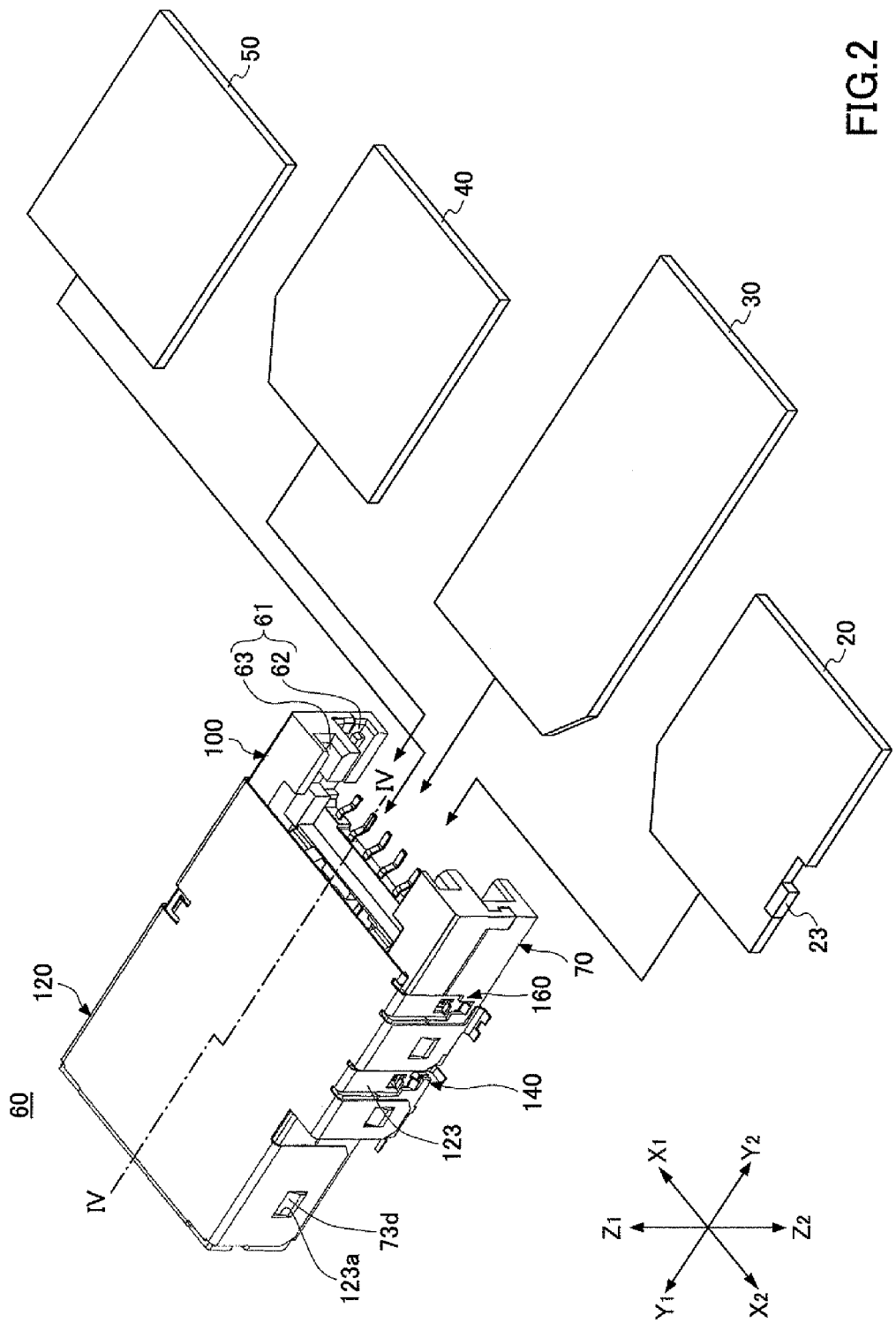
FIG. 2 is a diagram illustrating the card connector and various kinds of memory cards and an expansion module to be attached to the card connector according to the embodiment of the present invention.
Figure 3:
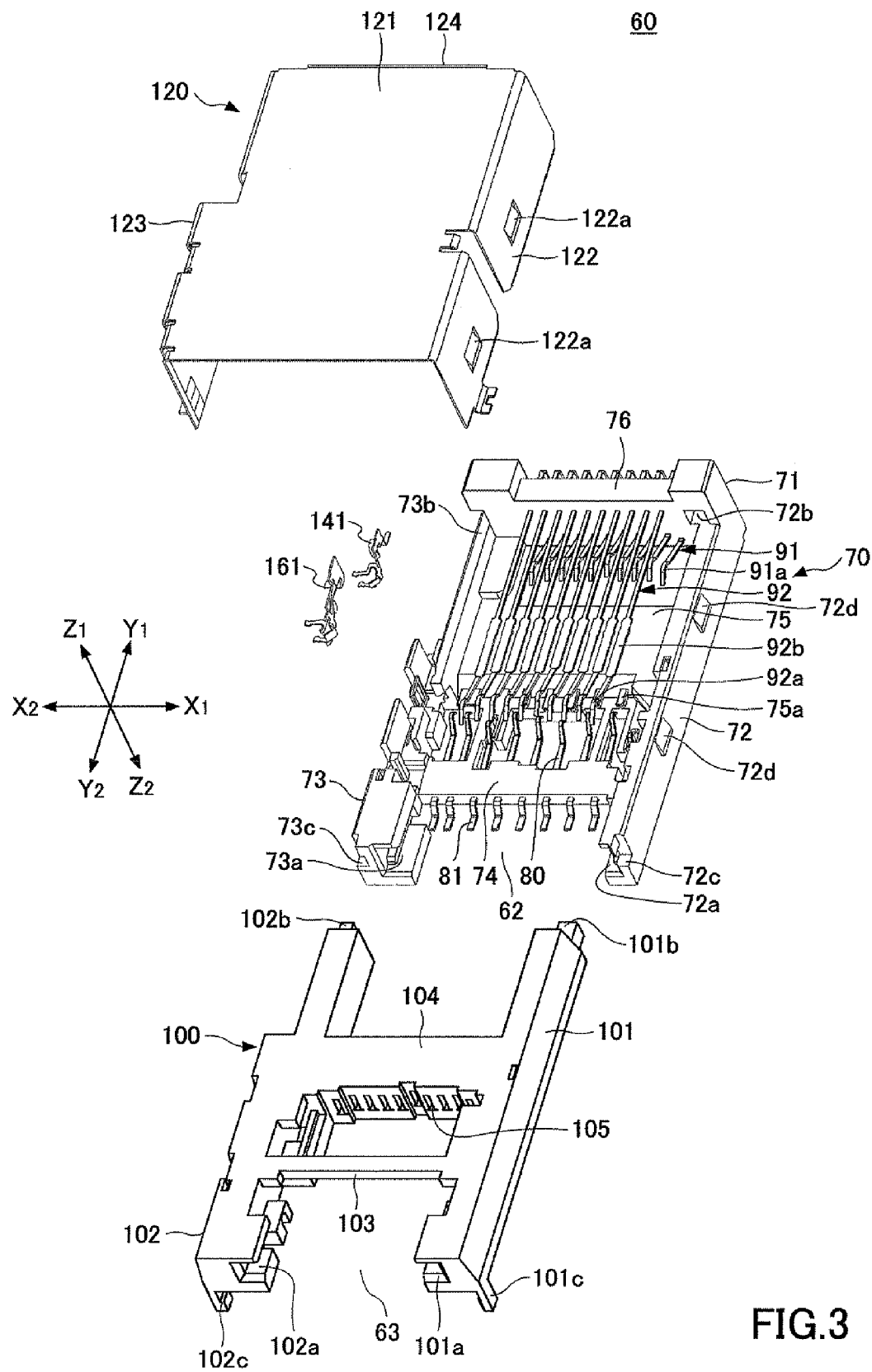
FIG. 3 is an exploded perspective view of the card connector according to the embodiment of the present invention.
Figure 4:
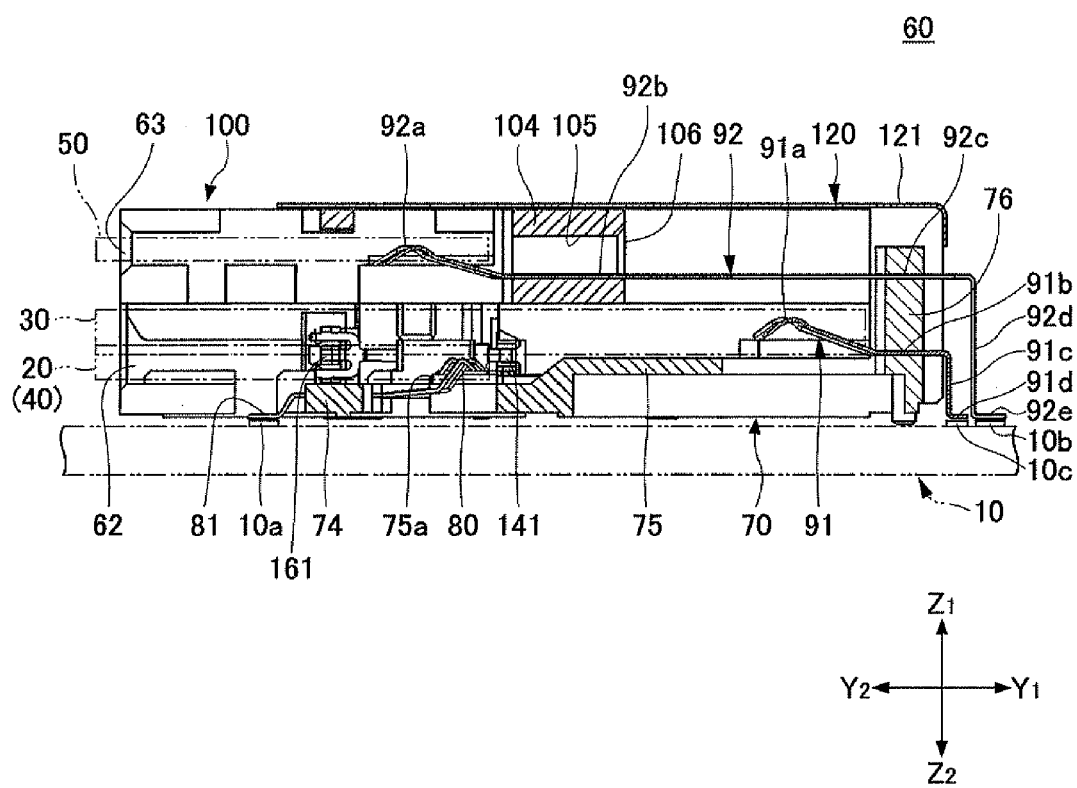
FIG. 4 is a cross-sectional view of the card connector of FIG. 2, taken along line IV-IV, according to the embodiment of the present invention.
Figure 5:
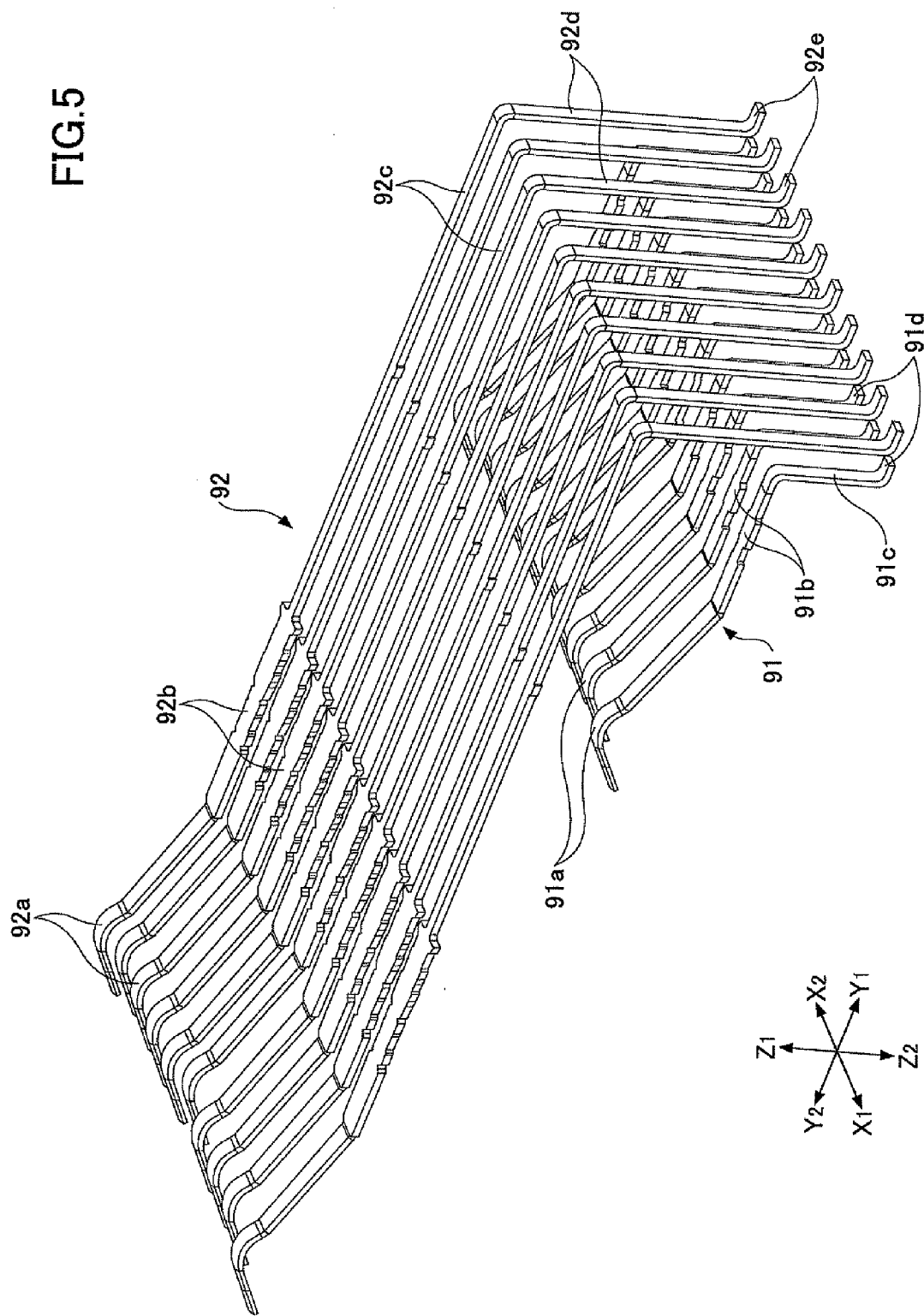
FIG. 5 is an enlarged perspective view of second memory card contacts and module contacts of the card connector according to the embodiment of the present invention.

FIG. 1 is a perspective view of the card connector 60, illustrating its exterior. FIG. 2 is a diagram illustrating the card connector 60 and various kinds of memory cards 20, 30, and 40 and an expansion module 50 to be attached to the card connector 60. FIG. 3 is an exploded perspective view of the card connector 60. FIG. 4 is a cross-sectional view of the card connector 60 of FIG. 2, taken along line IV-IV. FIG. 5 is an enlarged perspective view of second memory card contacts 91 and module contacts 92 of the card connector 60.

Figure 6:
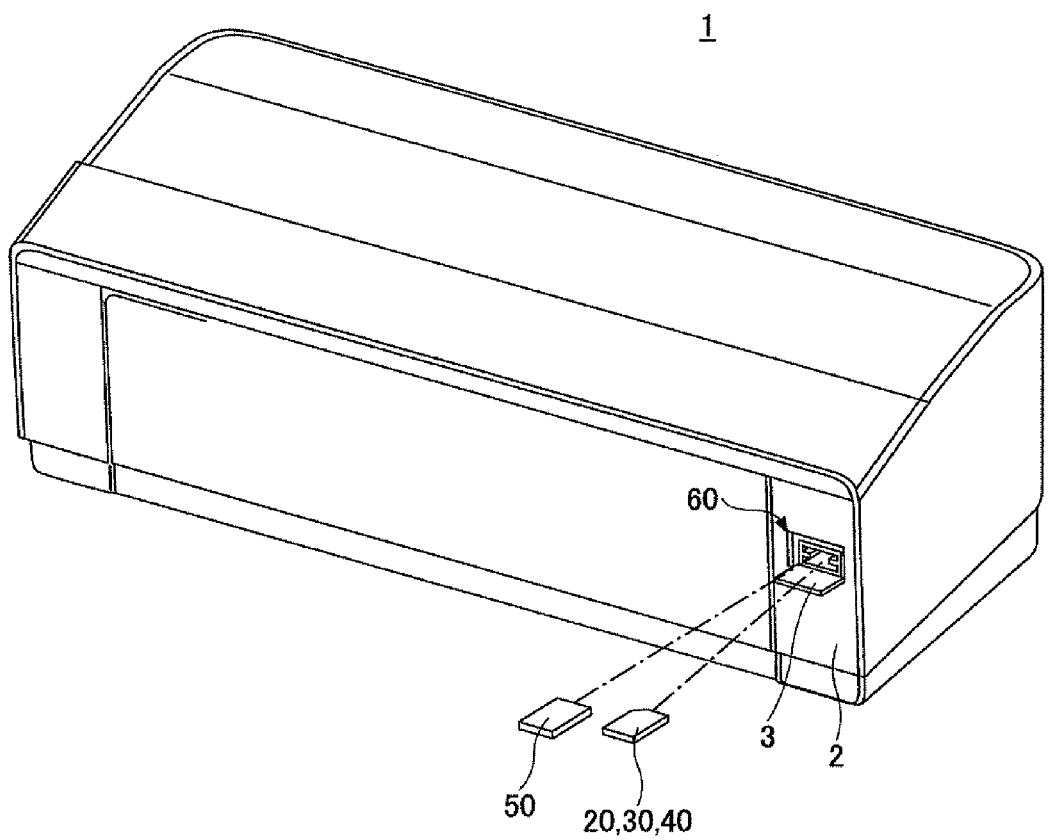
FIG. 6 is a perspective view of an electronic apparatus in which the card connector is incorporated according to the embodiment of the present invention.

FIG. 6 is a perspective view of an electronic apparatus 1 in which the card connector 60 is incorporated.

In FIG. 1 through FIG. 5, $X_1$-$X_2$ represents the directions of width, $Y_1$-$Y_2$ represents the directions of length, and $Z_1$-$Z_2$ represents the directions of thickness (height) of the card connector 60, the memory cards 20, 30, and 40, and the expansion module 50. Further, $Y_1$ represents the direction in which the memory cards 20, 30, and 40, and the expansion module 50 are inserted into (attached to) the card connector 60, and $Y_2$ represents the direction in which the memory cards 20, 30, and 40, and the expansion module 50 are ejected from the card connector 60.

The card connector 60 includes a lower housing 70 (a base housing), first memory card contacts 80, the second memory card contacts 91, the module contacts 92, an upper housing 100 (a module housing), and a cover member 120 covering the upper housing 100. The upper housing 100 is stacked on the upper ($Z_1$ side) surface of the lower housing 70. The cover member 120 is formed of a metal plate.

The card connector 60 has an insertion opening 61 at its $Y_2$ end. The insertion opening 61 includes a lower insertion slot (opening) 62 and an upper insertion slot (opening) 63. The lower insertion slot 62 is formed in the lower housing 70. The upper insertion slot 63 is formed in the upper housing 100.

The card connector 60 is mounted on a printed circuit board 10 (FIG. 4) by soldering the contacts 80, 91, and 92 to corresponding pads 10a, 10b, and 10c (FIG. 4), respectively, on the printed circuit board 10. The card connector 60 is incorporated into the electronic apparatus 1 (FIG. 6) together with the printed circuit board 10. As illustrated in FIG. 6, the card connector 60 is incorporated in the electronic apparatus 1 with the insertion opening 61 exposed on a front panel 2 of the electronic apparatus 1. The front panel 2 includes a lid 3, which is closed to prevent the insertion opening 61 from being exposed except when attaching or detaching the memory card 20, 30, or 40 or the expansion module 50.

As illustrated in FIG. 2, the memory cards 20, 30, and 40 are selectively attachable to the card connector 60 using the lower insertion slot 62. Hereinafter, by way of example, the memory card 20 is referred to as "SD memory card 20," the memory card 30 is referred to as "memory stick 30," and the memory card 40 is referred to as "multimedia card 40." Further, the expansion module 50 is attachable to the card connector 60 using the upper insertion slot 63. In this embodiment, the expansion module 50 is an expansion memory module. Alternatively, however, the expansion module 50 may be an expansion CPU module or an expansion communications module.

The SD memory card 20 and the multimedia card 40 have substantially the same outside dimensions, have a slightly greater width than that of the memory stick 30, and have the same terminal arrangement, but are different in that the SD memory card 20 is provided with a knob 23 for preventing inadvertent erasure of data.

The lower housing 70 is an insert molded component. Referring to FIG. 3, the lower housing 70 includes a lower housing body 71 of synthetic resin. The first memory card contacts 80, the second memory card contacts 91, and the module contacts 92 are integrated with the lower housing body 71 by insert molding (into a single insert-molded component). Further, the lower housing body 71, which has a substantially quadrangular frame shape, includes an $X_1$-side frame rod 72, an $X_2$-side frame rod 73, and three horizontally disposed parts 74, 75, and 76.

The frame rods 72 and 73 have respective guide grooves 72a and 73a on their interior side. The center horizontally disposed part 75 has projection parts 75a projecting in the $Z_1$ direction on its $Y_2$-side step part. Further, referring to FIG. 2 through FIG. 4, movable terminal members 141 and 161, which respectively form a switch 140 and a switch 160 that detect card insertion, are press-fit into and fixed to the lower housing body 71.

Referring to FIG. 3 and FIG. 4, the first memory card contacts 80 are inserted in the horizontally disposed part 74 positioned close to the lower insertion slot 62, and are arranged in correspondence to the terminals of each of the SD memory card 20 and the multimedia card 40. Each of the first memory card contacts 80 includes a terminal part 81 to be soldered and fixed to the corresponding pad 10a of the printed circuit board 10. Providing the first memory card contacts 80 allows the card connector 60 to be applied to the SD memory card 20 and the multimedia card 40.

According to this embodiment, the second memory card contacts 91 and the module contacts 92 are integrated with the horizontally disposed part 76, provided at the $Y_1$ end of the lower housing body 71, (into a single insert-molded component) by insert molding. The second memory card contacts 91 and the module contacts 92 are substantially L-shaped as illustrated in FIG. 4 and FIG. 5.

As illustrated in FIG. 4, the second memory card contacts 91 connect to the memory stick 30. Each of the second memory card contacts 91 includes a contact part 91a to connect to (come into contact with) the memory stick 30, a fixed part 91b inserted in the horizontally disposed part 76, a vertical part 91c bent at a right angle with the fixed part 91b and extending vertically (in the Z1 and the Z2 directions), and a terminal part 91d formed at the lower end of the vertical part 91c to be soldered and fixed to the corresponding pad 10c of the printed circuit board 10. The contact part 91a, the fixed part 91b, the vertical part 91c, and the terminal part 91d are integrated into a unitary structure.

Providing the second memory card contacts 91 allows the card connector 60 to be applied to the memory stick 30 as well as the SD memory card 20 and the multimedia card 40.

As illustrated in FIG. 4, the module contacts 92 connect to the expansion module 50. Each of the module contacts 92 includes a contact part 92a to connect to (come into contact with) the expansion module 50, a bulge part 92b fit to the upper housing 100 as described below, a fixed part 92c inserted in the horizontally disposed part 76, a vertical part 92d bent at a right angle with the fixed part 92c and extending vertically (in the Z1 and the Z2 directions), and a terminal part 92e formed at the lower end of the vertical part 92d to be soldered and fixed to the corresponding pad 10b of the printed circuit board 10. The contact part 92a, the bulge part 92b, the fixed part 92c, the vertical part 92d, and the terminal part 92e are integrated into a unitary structure.

Providing the module contacts 92 allows the card connector 60 to be applied to the expansion module 50 as well as the SD memory card 20, the memory stick 30, and the multimedia card 40. As illustrated in, for example, FIG. 3 through FIG. 5, the module contacts 92 are elongated in the $Y_1$ and the $Y_2$ directions relative to the second memory card contacts 91.

On the other hand, the upper housing 100 is a molded component of synthetic resin. As illustrated in FIG. 3, the upper housing 100 has a frame structure formed of an $X_1$-side frame rod 101, an $X_2$-side frame rod 102, and two horizontally disposed parts 103 and 104. The frame rods 101 and 102 have respective guide grooves 101a and 102a on their interior sides.

As illustrated in FIG. 3, multiple through holes 105 are formed in the horizontally disposed part 104. The through holes 105 correspond to the module contacts 92, and are large enough to allow penetration of the corresponding contact parts 92a. Further, each through hole 105 has a tapered part 106 (FIG. 4) formed at its $Y_1$-side entrance.

As illustrated in FIG. 2 and FIG. 3, the cover member 120 has a top plate part 121, side plate parts 122 and 123 on the $X_1$ and $X_2$ sides, respectively, and a $Y_1$-side rear plate part 124, which are integrated into a unitary structure. The cover member 120 covers the lower housing 70 and the upper housing 100 from above so as to protect the contacts 80, 91, and 92.

By way of example, the card connector 60 having the above-described structure may be manufactured as follows.

First, the lower housing 70 is formed by insert molding. For example, the lower housing body 71 is molded by setting the first memory card contacts 80, the second memory card contacts 91, and the module contacts 92 in a mold and injecting synthetic resin into the mold.

As a result, the lower housing 70 is manufactured, where the first memory card contacts 80 are insert-molded in the horizontally disposed part 74 and the second memory card contacts 91 and the module contacts 92 are insert-molded in the horizontally disposed part 76. On the other hand, the upper housing 100, which does not require insert molding, is formed by injecting synthetic resin into a mold.

In order to attach the upper housing 100 to the lower housing 70 thus formed, the upper housing 100 is placed on the lower housing body 71 of the lower housing 70, and is caused to slide in the $Y_1$ direction along the upper ($Z_1$ side) surface of the lower housing body 71. As a result, the contact parts 92*a* of the module contacts 92 are guided by the corresponding tapered parts 106 to be smoothly inserted into the corresponding through holes 105 and project from the corresponding through holes 105 in the $Y_2$ direction. The bulge parts 92*b* are fit into the corresponding through holes 105.

With the upper housing 100 slid to a predetermined attachment position on the lower housing 70, projections 101*b* and 102*b* (FIG. 3) formed on the upper housing 100 are fit into recesses 72*b* and 73*b* (FIG. 3), respectively, formed in the lower housing 70, and projections 101*c* and 102*c* of the upper housing 100 are fit into recesses 72*c* and 73*c* (FIG. 3), respectively, formed in the lower housing 70, so that the upper housing 100 is fixed to the lower housing 70. Further, the upper housing 100 is stacked on the lower housing 70 by being attached to the lower housing 70. The projections 101*b* and 102*b* are detachable from the recesses 72*b* and 73*b*, respectively. The projections 101*c* and 102*c* are detachable from the recesses 72*c* and 73*c*, respectively.

The cover member 120 has openings 122*a* and 123*a* of its side plate parts 122 and 123, respectively, fit to corresponding projections 72*d* and 73*d* of the lower housing body 71 so as to be fixed to and cover the stacked lower housing 70 and upper housing 100.

As described above, the lower housing 70 is configured to allow internal attachment of the SD memory card 20, the memory stick 30, and the multimedia card 40. Further, the upper housing 100 is configured to allow internal attachment of the expansion module 50.

The SD memory card 20, the memory stick 30, and the multimedia card 40 are selectively attached to the card connector 60 using the lower insertion slot 62. The SD memory card 20 is attached with its terminals (not graphically illustrated) in contact with the corresponding first memory card contacts 80. The multimedia card 40 is also attached with its terminals (not graphically illustrated) in contact with the corresponding first memory card contacts 80.

When the memory stick 30 is inserted through the lower insertion slot 62, the memory stick 30 mounts the projection parts 75*a* to be forcibly displaced in the $Z_1$ direction immediately before the $Y_1$ end of the memory stick 30 reaches the ends of the first memory card contacts 80. Then, the memory stick 30 moves over the first memory card contacts 80 to come into contact with the second memory card contacts 91 to establish electrical connection (FIG. 4). As a result, the deformation of the end parts of the first memory card contacts 80 in the $Z_2$ direction is limited so as to prevent plastic deformation of the first memory card contacts 80.

According to the card connector 60 of this embodiment, the module contacts 92 to be connected to the expansion module 50 are electrically separated (or isolated) from the first memory card contacts 80 to be connected to the SD memory card 20 or the multimedia card 40 and the second memory card contacts 91 to be connected to the memory stick 30.

That is, as illustrated in FIG. 4, the first memory card contacts 80 connect to the corresponding pads 10*a* of the printed circuit board 10, the second memory card contacts 91 connect to the corresponding pads 10*c* of the printed circuit board 10, and the module contacts 92 connect to the corresponding pads 10*b* of the printed circuit board 10.

Thus, the card connector 60 according to this embodiment allows attachment of the expansion module 50 through the upper insertion slot 63 with the SD memory card 20, the memory stick 30, or the multimedia card 40 being selectively attached through the lower insertion slot 62. That is, the card connector 60 allows simultaneous attachment of the expansion module 50 and one of different kinds of memory cards, that is, the SD memory card 20, the memory stick 30, or the multimedia card 40.

As a result, as illustrated in FIG. 6, in the case of applying the card connector 60 to the electronic apparatus 1, there is no need to provide a connector for the expansion module 50 separately from the card connector 60, so that the electronic apparatus 1 can be reduced in size. Further, since the card connector 60 also serves as a connector for the expansion module 50, it is possible to reduce the number of components and cost.

Thus, according to an aspect of the present invention, a card connector is provided that can reduce the size of an electronic apparatus to which an expansion module is to be attached.

Thus, according to an aspect of the present invention, not only different kinds of memory cards but also an expansion module is attachable to a card connector. This eliminates the necessity of providing a separate connector for the expansion module in an electronic apparatus, thus making it possible to reduce the size, the number of components, and the cost of the electronic apparatus.

All examples and conditional language recited herein are intended for pedagogical purposes to aid the reader in understanding the present invention and the concepts contributed by the inventor to furthering the art, and are to be construed as being without limitation to such specifically recited examples and conditions, nor does the organization of such examples in the specification relate to a showing of the superiority or inferiority of the present invention. Although the embodiment of the present invention has been described in detail, it should be understood that various changes, substitutions, and alterations could be made hereto without departing from the spirit and scope of the present invention.

For example, in the above-described embodiment, a single layer of the upper housing 100 to serve as a module housing is stacked on the lower housing 70 to serve as a base housing. However, two or more upper housings 100 may be stacked in layers on the lower housing 70. In this case, the module contacts 92 attached to each upper housing 100 are electrically separated from the first memory card contacts 80 and the second memory card contacts 91.

Further, in the above-described embodiment, the module contacts 92 are fixed to the lower housing 70 by insert molding. Alternatively, the module contacts 92 may not be insert-molded in the lower housing 70 because the module contacts 92 are separated from the second memory card contacts 91 according to the card connector 60. In this case, the module contacts 92 may be fixed to the upper housing 100. The module contacts 92 may be fixed to the upper housing 100 by insert-molding the module contacts 92 in the horizontally disposed part 104 of the upper housing 100.

What is claimed is:

1. A card connector, comprising:
a base housing configured to allow attachment of different kinds of memory cards through a first insertion opening;
a plurality of kinds of memory card contacts held in the base housing and configured to connect to the corresponding memory cards;
a module housing stacked on the base housing and configured to allow attachment of an expansion module through a second insertion opening positioned over the first insertion opening in a direction in which the module housing is stacked on the base housing; and
a module contact configured to connect to the expansion module,
wherein the memory card contacts and the module contact are electrically separated.

2. The card connector as claimed in claim 1, wherein the expansion module is an expansion memory.

3. The card connector as claimed in claim 1, wherein the module contact is held in the base housing.

4. The card connector as claimed in claim 1, wherein the module housing is detachably attached to the base housing.

5. The card connector as claimed in claim 4, wherein the module housing is configured to be slidable with respect to the base housing for the attachment thereto.

6. The card connector as claimed in claim 1, wherein the base housing and the memory card contacts are a single insert-molded component.

7. The card connector as claimed in claim 6, wherein the module contact is further insert-molded in the single insert-molded component.

* * * * *